US008746430B2

(12) United States Patent
Krauss et al.

(10) Patent No.: US 8,746,430 B2
(45) Date of Patent: Jun. 10, 2014

(54) METHOD OF FEEDING A CLUTCH CYLINDER OF A HYDRAULICALLY ACTUATED CLUTCH SYSTEM

(75) Inventors: Christian Krauss, Cologne (DE); Marco Siebigteroth, Hennef (DE); Georg Hillebrand, Roesrath (DE); Reinhard Moehlmann, Cologne (DE); Stefan Kirschstein, Odenthal (DE)

(73) Assignee: Getrag Ford Transmissions GmbH, Cologne (DE)

( * ) Notice: Subject to any disclaimer, the term of this patent is extended or adjusted under 35 U.S.C. 154(b) by 1014 days.

(21) Appl. No.: 12/269,433

(22) Filed: Nov. 12, 2008

(65) Prior Publication Data

US 2009/0127061 A1    May 21, 2009

(30) Foreign Application Priority Data

Nov. 21, 2007   (DE) .......................... 10 2007 056 175

(51) Int. Cl.
*F16D 48/02*   (2006.01)
(52) U.S. Cl.
USPC ....................................... 192/85.63
(58) Field of Classification Search
None
See application file for complete search history.

(56) References Cited

U.S. PATENT DOCUMENTS

| 5,853,076 A | 12/1998 | McKee et al. | |
| 7,282,005 B2 * | 10/2007 | Shimizu et al. | 192/85.63 |
| 2007/0017772 A1 * | 1/2007 | Long et al. | 192/109 F |

FOREIGN PATENT DOCUMENTS

| DE | 10 2006 006 181 | 8/2007 |
| EP | 1 767 824 | 3/2007 |

* cited by examiner

*Primary Examiner* — Rodney Bonck
(74) *Attorney, Agent, or Firm* — Schlee IP International, P.C.; Alexander R. Schlee

(57) ABSTRACT

A method of feeding a clutch cylinder in a hydraulically actuated clutch system in a motor vehicle and a respective hydraulically actuated clutch system are suggested. The clutch system comprises at least one clutch that can be closed by filling the clutch cylinder; and a hydraulic system that provides a system pressure and has a clutch control valve having an inlet and an outlet. A system pressure is applied at the inlet of the control valve; the clutch pressure for actuating the clutch is provided at the outlet; and the system pressure is decreased pressure prior to and during the filling of the clutch cylinder. The decreased system pressure allows a high volume flow and therefore a fast filling of the clutch cylinder without establishing a premature torque transmitting capacity in the clutch.

10 Claims, 4 Drawing Sheets

METHOD OF FEEDING A CLUTCH CYLINDER OF A HYDRAULICALLY ACTUATED CLUTCH SYSTEM

CROSS REFERENCE TO RELATED APPLICATION

This application claims the priority right from the German patent application DE 102007056175.1 that was filed on Nov. 21, 2007, the content of which is herewith incorporated in its entirety by reference.

BACKGROUND OF THE INVENTION

The invention relates to a method of feeding a clutch cylinder of a hydraulically actuated clutch system.

From the EP 1 767 824 A1 a hydraulically actuated clutch system as a part of a dual clutch transmission in a motor vehicle is known comprising a first clutch and a second clutch. Both clutches are assigned to one clutch cylinder each, allowing to close the clutch against a force from a clutch release spring. The required pressure for closing the clutch is provided by a hydraulic system providing via a pump via a main pressure control a system pressure. Each clutch of the dual clutch transmission is in addition assigned to the system pressure at the valve inlet and to a clutch pressure at a valve outlet for actuating the clutch. The clutch is connected to the clutch cylinder.

From the prior art it is known for creating a short filling time and therefore a shorter switching time in a dual clutch transmission to close the clutch cylinder in a clutch starting from the open position to an engagement point to provide a particular filling pressure over a certain time period that is significantly higher than the engagement point pressure that is necessary for maintaining the clutch at its engagement point. The engagement point of the clutch is that position of the clutch where the clutch linings abut against each other, but the force pressing the clutch linings against each other is zero or so low that practically no torque transmitting capacity is established. After terminating the filling pressure the engagement point pressure is then applied as a target pressure.

For creating a short filling time, a high value for the filling pressure can be set over a short period of time. However, this creates the risk that after terminating the filling pressure, the pressure in the clutch cylinder may exceed, due to dynamic effects, the engagement point pressure and therefore close the clutch beyond its engagement point, establishing an undesired torque transmitting capacity. This may result in a noticeable impact that is perceived as disadvantageous for the driving comfort. Providing a method for fast filling without affecting the driving comfort is difficult.

SUMMARY OF THE INVENTION

It is an object of the invention to provide a method for filling a clutch cylinder of a hydraulically actuated clutch system allowing to fill the clutch cylinder quickly.

According to an aspect of the invention, a method of feeding a clutch cylinder in a hydraulically actuated clutch system in a motor vehicle and a respective hydraulically actuated clutch system are suggested. The clutch system comprises at least one clutch that can be closed by filling the clutch cylinder; and a hydraulic system that provides a system pressure and has a clutch control valve having an inlet and an outlet. A system pressure is applied at the inlet of the control valve; the clutch pressure for actuating the clutch is provided at the outlet; and the system pressure is decreased pressure prior to and during the filling of the clutch cylinder. The decreased system pressure allows a high volume flow and therefore a fast filling of the clutch cylinder without establishing a premature torque transmitting capacity in the clutch.

Decreasing the system pressure prior to and during the filling action of the clutch cylinder means according to a preferred embodiment decreasing the pressure at the valve inlet of the clutch control valve. By decreasing the system pressure, the difference between the filling pressure and the engagement point pressure is reduced. It has been found that in case of a decreased system pressure while maintaining the target pressures at the same level (filling pressure, engagement point pressure) high volume flows can be created through the clutch control valve. This results in a fast filling of the clutch cylinders.

The clutch system may be part of a dual clutch transmission. The clutch system comprises a first and a second clutch. The method according to the invention can be applied to one clutch, respectively. The dual clutch transmission comprises a first partial transmission and a second partial transmission each that are assigned to several gears. Preferably, the respective gears can be engaged or disengaged by the hydraulic system.

The system pressure can be decreased to a pressure level depending on the driving conditions of the motor vehicle. The decrease can be established in a variety of different levels or can be omitted entirely if the respective driving conditions do not allow a decrease for various reasons.

For example, the pressure level to which the system pressure is decreased can be the pressure level that is required by at least one further component of the hydraulic system. For example, this other component can be the clutch cylinder of the other clutch in the dual clutch transmission, wherein the pressure that is at least required in this clutch cylinder does then depend from the motor torque that is transmitted by this clutch safely and without slippage.

The pressure level can depend from the rotational speed of the motor. In the alternative or in addition the pressure level may depend from the temperature of a pressure medium in the hydraulic system. For example, if the temperature of the pressure medium (for example hydraulic oil) is lower than a bottom threshold value or higher than a top threshold value, no decrease in the system pressure is conducted or only a small decrease.

The clutch control valve may comprise a valve cylinder and a control piston that can be shifted in axial direction within the valve cylinder. The control valve controls by its axial position in the valve cylinder the pressure at the valve outlet. The position of the control piston in axial direction can determine a cross section of the flow between an inlet and the pressure chamber of the clutch control valve.

BRIEF DESCRIPTION OF THE DRAWINGS

In the following, the invention is explained in further detail by referring to the drawings. In the drawings show.

DETAILED DESCRIPTION OF THE DRAWINGS

Figure 1:
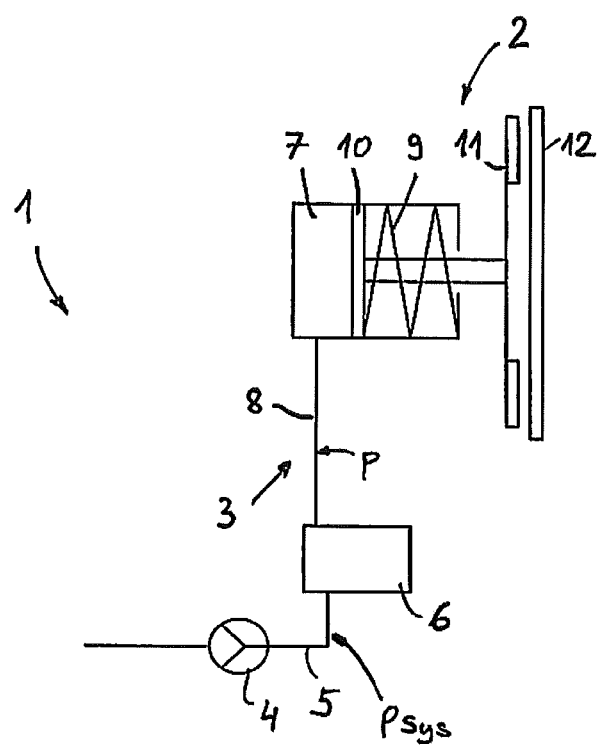
FIG. 1 a schematic illustration of the a clutch system comprising a clutch and a hydraulic system.

FIG. 1 shows a schematic illustration of a clutch system 1 comprising a clutch 2 and a hydraulic system 3. The hydraulic system 3 comprises a pressure source 4, comprising a pump that is not shown in detail and a main pressure control. The pressure source provides a system pressure $p_{Sys}$ in the hydraulic system 3, said pressure being present in line 5.

The hydraulic system 3 comprises further a clutch control valve 6 that is connected at its input side via a line 5 with the pressure source 4 and at its output side via a line 8 with a clutch cylinder 7. By means of the clutch control valve 6 a clutch pressure p can be adjusted, that can shift a clutch piston 10 within a clutch cylinder 7 against a force created by a clutch release spring 9 in axial direction. A clutch lining 11 is connected to the clutch piston 10 in a fixed manner and can be forced against a clutch lining 12 that is fixed in axial direction when the force generated by the pressure p and is exerted onto the clutch piston is higher than the force from the clutch release spring 9. If the clutch piston 10 is not subjected to any hydraulic pressure, the clutch release spring 9 forces the two clutch linings 11, 12 apart from each other so that the clutch 2 is open and no torque can be transmitted.

It is now possible to adjust a pressure $p_{Stroke}$ in clutch cylinder 7 making the clutch linings 11, 12 abut against each other, but the force pressing the clutch linings 11, 12 against each other is zero or substantially zero. In this case, the force acting on the clutch piston 10 due to pressurizing the clutch cylinder 7 equals to the force of the compressed clutch release spring 9. A further increase in the pressure in the clutch cylinder 7 would result immediately in pressing the clutch linings 11, 12 against each other, allowing the clutch to transmit torque.

When the clutch piston 7 is subjected to the engagement point pressure $p_{Stroke}$, the clutch 2 assumes its engagement point state where just no torque is transmitted via the clutch 2. For example, the clutch 2 can be part of a dual clutch transmission comprising two wet clutches and be mounted into a motor vehicle. For short gear shifting time the filling time of the clutch 2 or of other clutches in the dual clutch transmissions should be kept as short as possible. Filling time should be understood as the time that is required to feed the clutch for closing it from its entirely open position up to the engagement point.

Figure 2:
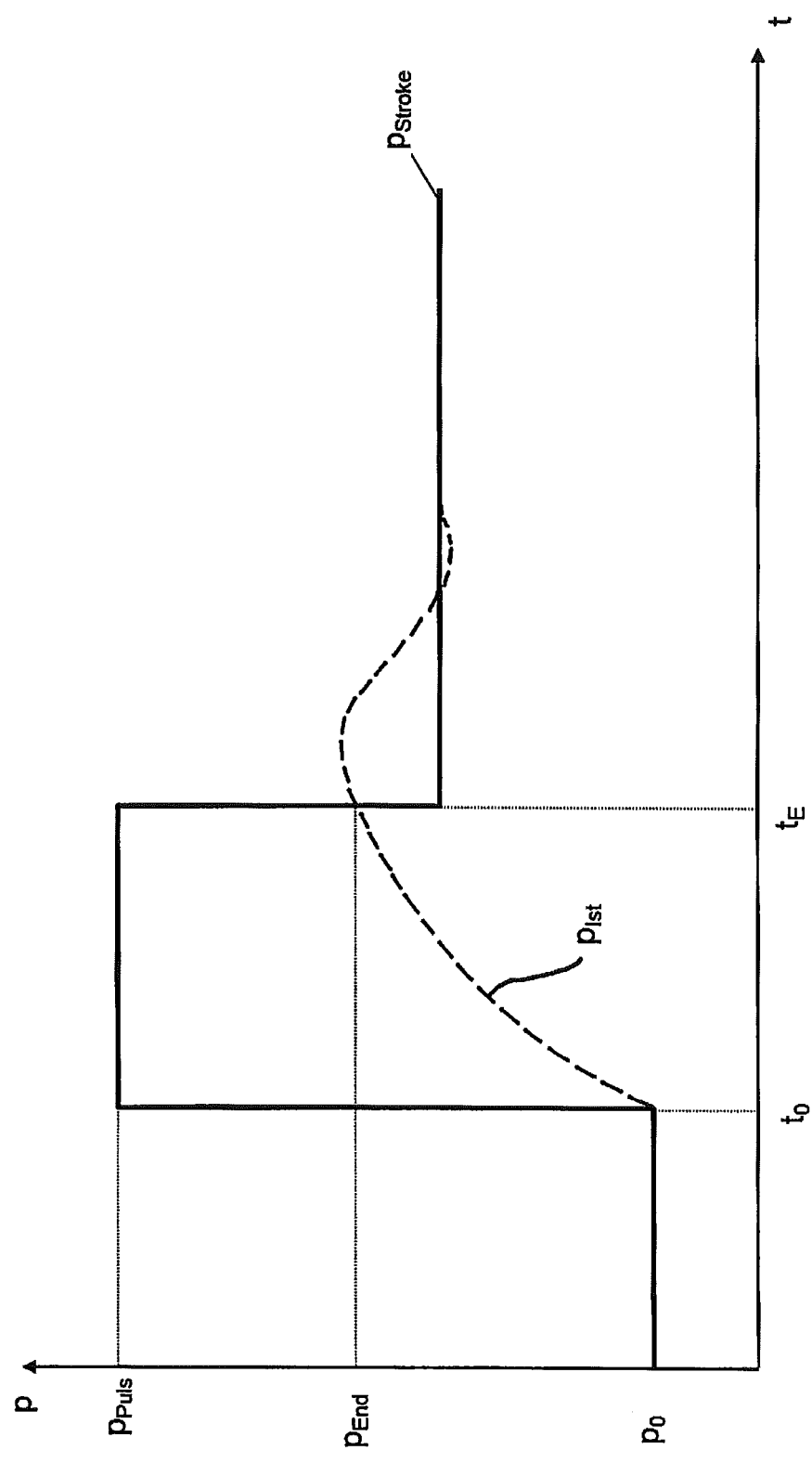
FIG. 2 graphs showing the feeding action of the clutch.

FIG. 2 shows various pressure graphs for filling the clutch cylinder 7. Starting from a pressure $p_0$ and a starting time $t_0$ the filling action is started when as a target value a filling pressure $p_{Puls}$ is applied. Applying the filling pressure $p_{Puls}$ is maintained until a measured actual pressure $p_{Ist}$ reaches a turn off pressure $p_{End}$. The turn off pressure $p_{End}$ is predetermined as well as the filling pressure $p_{Puls}$. When reaching the turn off pressure $p_{End}$ the clutch cylinder 7 is subjected to the engagement point pressure $p_{Stroke}$ as a target value (see end time $t_E$). After several milliseconds past the end time $t_E$ a PID-control is turned on that is superimposed to the clutch control valve 6 and corrects an electric control current for the clutch control valve for enhancing the pressure control quality.

Due to dynamic effects, the actual pressure $p_{Ist}$ still increases after reaching the turn off pressure $p_{End}$. At this point, the control is put into action, adjusting the actual pressure $p_{Ist}$ to become the engagement point pressure $p_{Stroke}$. When finally the actual pressure $p_{Ist}$ equals the engagement point pressure $p_{Stroke}$, another control is put into action that establishes for example by increasing the pressure in the clutch cylinder 7 a torque transmitting capacity in the desired speed and height.

Figure 3:
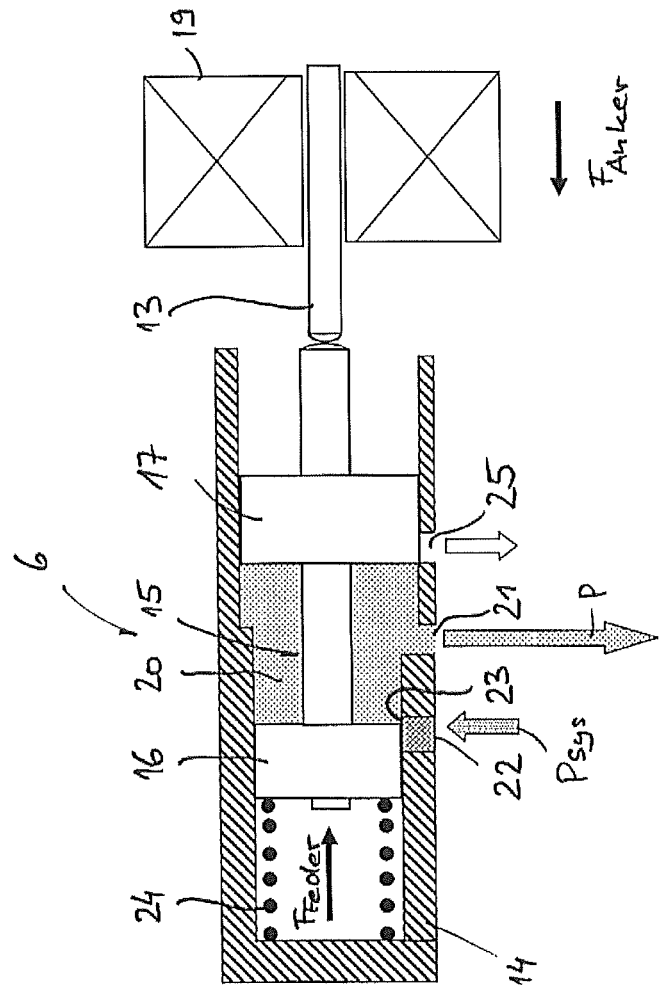
FIG. 3 a clutch valve at a high system pressure.
Figure 4:
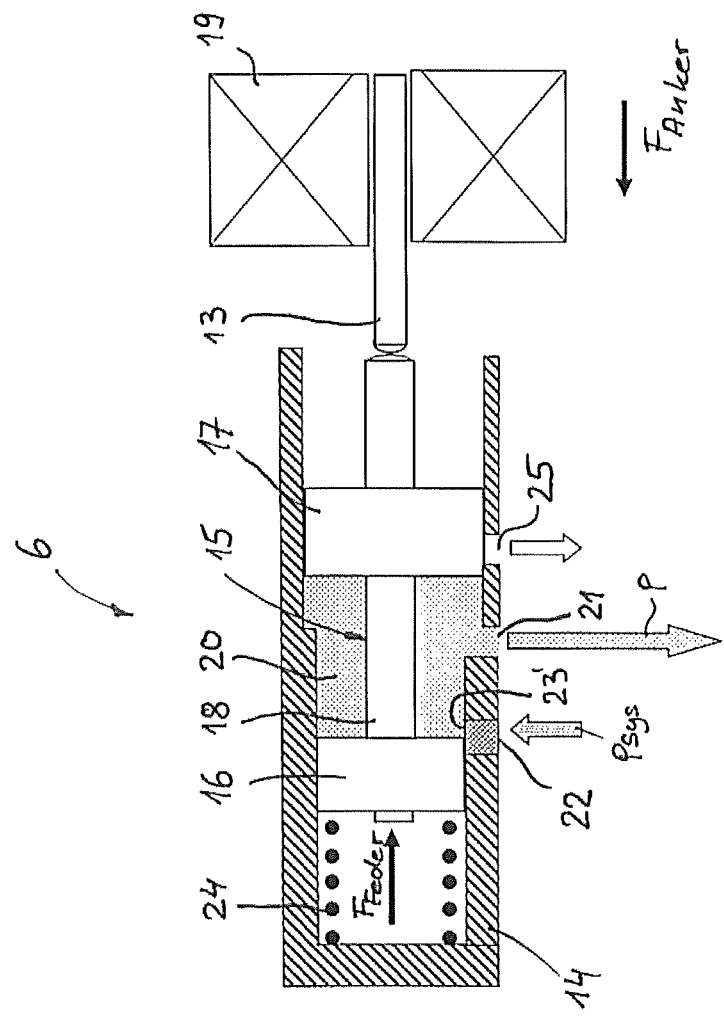
FIG. 4 the clutch at low system pressure.

The FIGS. 3 and 4 show the clutch control valve 6 that is only shown schematically in FIG. 1. The clutch control valve 6 comprises a valve cylinder 14 and a piston unit 15 that is provided in the valve cylinder such that it can be moved in axial direction. The piston unit 15 comprises a control piston 16 and a counter piston 17 that are connected to each other by means of a piston rod 18.

The piston unit 15 is forced in the illustration shown in FIGS. 3 and 4 by means of a pressure armature 13 to the left when an electromagnet 19 is fed with a control current for the clutch control valve 6.

The control piston 16, the counter piston 17 as well as the valve cylinder 14 define a pressure chamber 20 comprising a first outlet 21 that is connected via the line 8 (see FIG. 1) to the clutch cylinder 7. In this pressure chamber 20 a pressure p is established that is also applied to a clutch piston 10. In the FIGS. 3 and 4 the pressure p is illustrated by a dotted background for the pressure chamber 20 as well as by an arrow at the outlet 21.

The clutch control valve 6 comprises an inlet 22 where the system pressure $p_{Sys}$ is applied. The pressure $p_{Sys}$ is demonstrated by the boldly dotted area demonstrating that the system pressure $p_{Sys}$ is always higher as the pressure p. This applies also in case of the pressure decrease according to the present invention.

By means of the axial position of the control piston 16 a flow cross section 23 is defined between the inlet 22 and the pressure chamber 20. If now the pressure in the clutch cylinder 7 should be increased to the filling pressure $p_{Puls}$, the control piston 16 exposes a flow cross-section through which oil flows into the pressure chamber 20 and from there into the clutch cylinder 7 establishing the pressure $p_{Puls}$.

If the system pressure $p_{Sys}$ has been decreased prior to starting or during the filling action, the control piston 16 exposes, as can be seen in state shown in FIG. 4, a flow cross section 23' that is larger than the flow cross section in the state shown in FIG. 3. This results in a higher volume flow at the inlet 22 into the pressure chamber 20 allowing a faster filling.

If no control current is applied, the valve spring 24 pushes the piston unit 15 into a rest position where the control piston 16 makes the flow cross sections 23, 23' become zero and therefore separates the pressure chamber 20 completely from the inlet 22. At the same time, while the piston unit has assumed its rest position, the counter piston 17 exposes a second outlet 25 that switches the pressure chamber 20 pressureless. In this position, the clutch cylinder 7 can be emptied by the clutch release spring 9, resulting in opening of the clutch 2.

When applying a control current, the control piston 16 clears the connection between the inlet 22 and the pressure chamber 20, the flow cross section created thereby allowing a volume flow and therefore a pressure increase. The armature force $F_{Anker}$ from the pressure armature is counteracted by a spring force $F_{Feder}$ from the spring 24 as well as a hydraulic force resulting from the different cross sections of the control piston 16 and the counter piston 17.

After the end time $t_E$ (see FIG. 2) a control of the engagement point pressure $p_{Stroke}$ is taking place. If a low system pressure is established (see FIG. 4) the flow cross-section 23 that is determined by the control piston 16 is larger than in the case of a higher system pressure. This results in a reproducible control since shifting of the control piston 16 by a certain distance results in a lower percentage of change in the flow cross section 23.

LIST OF REFERENCE NUMERALS 1 clutch system
2 clutch
3 hydraulic system
4 pressure source 5 system pressure line
6 clutch control valve
7 clutch cylinder
8 clutch pressure line
9 clutch release spring
10 clutch piston
11 clutch lining
12 clutch lining
13 pressure armature
14 valve cylinder
15 piston unit
16 control piston
17 counter piston
18 piston rod
19 electromagnet
20 pressure chamber
21 first outlet
22 inlet
23 flow cross-section (also 23')
24 spring
25 second outlet

The invention claimed is:

1. Method of feeding a clutch cylinder of a hydraulically actuated clutch system in a motor vehicle, wherein the clutch system comprises at least one clutch that can be closed by filling the clutch cylinder; and a hydraulic system that provides a system pressure and has a clutch control valve having an inlet and an outlet, wherein the clutch control valve comprises a valve cylinder with a second outlet, a control piston, a counter piston and a piston rod connecting the counter piston with the control piston; said method comprising the method steps of:

applying the system pressure at the inlet of the control valve;

providing the clutch pressure for actuating the clutch at the outlet;

decreasing the system pressure at least prior to the filling of the clutch cylinder;

controlling the pressure at the outlet of the control valve by the position of the control piston in axial direction within the valve cylinder;

controlling the second outlet by the counter piston; and opening the second outlet in a disengaged position of the clutch releasing any pressure from the valve cylinder.

2. Method according to claim 1, wherein the system pressure that has been decreased at least prior to the filling of the clutch cylinder equals to a pressure that is required by at least one other component of the hydraulic system.

3. Method according to claim 1, wherein the pressure level depends on the rotational speed of a motor of the motor vehicle.

4. Method according to claim 1, wherein the pressure level depends on the temperature of a pressure medium in the hydraulic system.

5. Method according to claim 1, further comprising the method step of controlling a flow cross section between the inlet and the pressure chamber of the clutch control valve by the position of the control piston in axial direction.

6. A hydraulically actuated clutch system in a motor vehicle, comprising:

a clutch cylinder;

at least one clutch that can be closed by filling the clutch cylinder;

a hydraulic system providing a system pressure and having a clutch control valve with an inlet and an outlet, said outlet providing a clutch pressure for filling the clutch cylinder; and a control for applying the system pressure at the inlet of the control valve, said control being configured such that the system pressure is decreased at least prior to the filling of the clutch cylinder; wherein the clutch control valve comprises:

a valve cylinder and a control piston controlling by its position in axial direction within the valve cylinder the pressure at an outlet;

a counter piston;

a piston rod connecting the counter piston with the control piston; and a second outlet; wherein the counter piston controls the second outlet such that it is opened releasing any pressure from the valve cylinder when the clutch is in a disengaged position.

7. The clutch system according to claim 6, wherein the system pressure that has been decreased at least prior to the filling of the clutch cylinder equals to a pressure that is required by at least one other component of the hydraulic system.

8. The clutch system according to claim 6, wherein the pressure level depends on the rotational speed of a motor of the motor vehicle.

9. The clutch system according to claim 6, wherein the pressure level depends on the temperature of a pressure medium in the hydraulic system.

10. The clutch system according to claim 6, wherein the position of the control piston in axial direction determines a flow cross section between the inlet and the pressure chamber of the clutch control valve.

* * * * *

UNITED STATES PATENT AND TRADEMARK OFFICE
CERTIFICATE OF CORRECTION

PATENT NO. : 8,746,430 B2
APPLICATION NO. : 12/269433
DATED : June 10, 2014
INVENTOR(S) : Christian Krauss et al.

Page 1 of 1

It is certified that error appears in the above-identified patent and that said Letters Patent is hereby corrected as shown below:

In the Specification

Column 2, line 38 reads:

the motor. In the alternative or in addition the pressure level and should read:

the motor torque. In the alternative or in addition the pressure level

Signed and Sealed this
Twelfth Day of August, 2014

Michelle K. Lee
*Deputy Director of the United States Patent and Trademark Office*